Feb. 9, 1943.  W. B. FLANDERS  2,310,412
VIBRATION DAMPENER
Filed March 8, 1941

WITNESSES:
James K. Mosser
E. H. Lutz

INVENTOR
WARREN B. FLANDERS.
BY
A. B. Rhuvis
ATTORNEY

Patented Feb. 9, 1943

2,310,412

UNITED STATES PATENT OFFICE 2,310,412

VIBRATION DAMPENER

Warren B. Flanders, Philadelphia, Pa., assignor to Westinghouse Electric & Manufacturing Company, East Pittsburgh, Pa., a corporation of Pennsylvania Application March 8, 1941, Serial No. 382,324

3 Claims. (Cl. 253—77)

This invention relates to turbine blading and the like and it has for an object to provide improved means for damping vibration thereof.

A more particular object of the invention is to provide adjacent turbine blade surfaces with transverse grooves complementally forming openings for pins, which, under the influence of centrifugal force, set up frictional resistance opposing relative movement of the blade surfaces in opposite directions.

These and other objects are effected by the invention as will be apparent from the following description and claims taken in connection with the accompanying drawing, forming a part of this application, in which:

Figure 1:
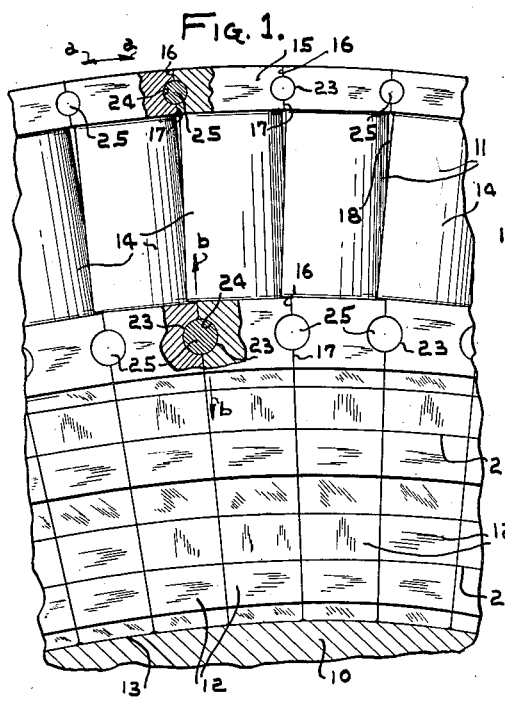
Fig. 1 is a detail view showing a plurality of blades with the improved damping means applied thereto.

In the drawing, a turbine rotor 10 has blades 11 attached thereto, as by means of the root portions 12 fitting the rotor groove 13.

Each blade includes, in addition to the root portion 12, a blade portion 14, and a shroud portion 15; and, with assembly of the blades in a row, the shroud and root portions have end faces 16 and 17 extending radially and in contiguous relation and the blade portions form blade passages 18.

Figure 4:
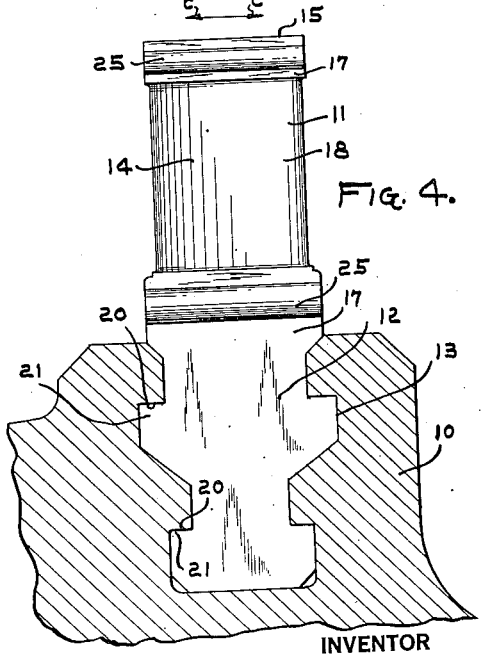
Fig. 4 is a transverse view representative of any of the preceding figures and particularly Fig. 1.

Assuming that the blades are held by the blade groove shoulders 20 overhanging the T-root shoulders 21 and that the blades tend to vibrate in the direction a—a, Fig. 1, then relative motion of the adjacent blade surfaces will occur in the direction b—b, the direction of motion of one surface being opposite to that of the other. Likewise with vibration in the direction c—c (Fig. 4), adjacent blades will usually have different amplitudes.

To oppose the relative motion in the direction b—b, as well as in the direction c—c, either or both the shroud and root faces 16 and 17 are formed with transverse grooves 23 and the grooves of adjacent faces complementally form openings 24 for rods or pins 25. The pins are held in close contact with the groove surfaces by centrifugal force and the friction thereof with respect to the blades serves to dampen vibration of the latter.

If, with vibration in the direction c—c, adjacent blades have the same amplitude, the pins in the grooves will have a different movement with respect to the blades, serving to dampen vibration. Means, such as peening over the ends of the grooves after inserting the pins, are employed to keep the pins from coming out of the grooves.

In Fig. 1, both the pins and the openings are shown as being of circular cross section, the openings, of course, being at least large enough to receive the pins. With this arrangement, tendency of the blade surfaces to move in opposite directions to the small extent sufficient for blade vibration is resisted by the frictional effect of the pin engaging the recess surfaces. Centrifugal force keeps a pin as far out as possible and causes it to engage the portions of the blade surfaces resisting outward movement under pressure dependent upon such a force. Under these conditions, if the blade surfaces tend to move to the extent indicated, this movement causes relative sliding of the blade and pin surfaces and the energy dissipation so provided dampens vibration.

Figure 2:
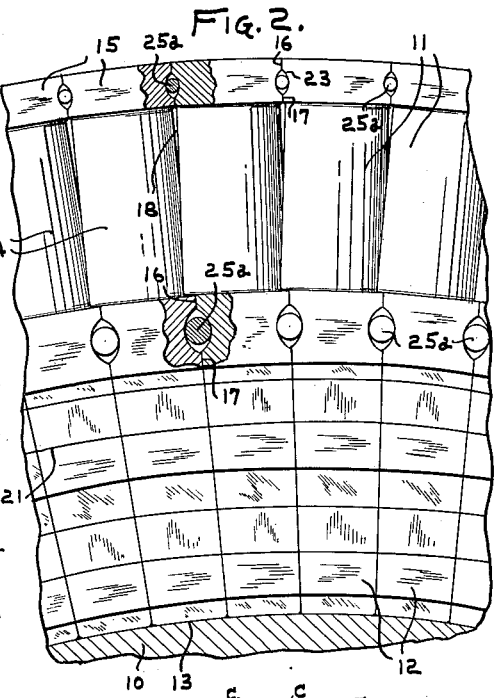
Fig. 2 is a view showing a modified form of damping means.
Figure 3:
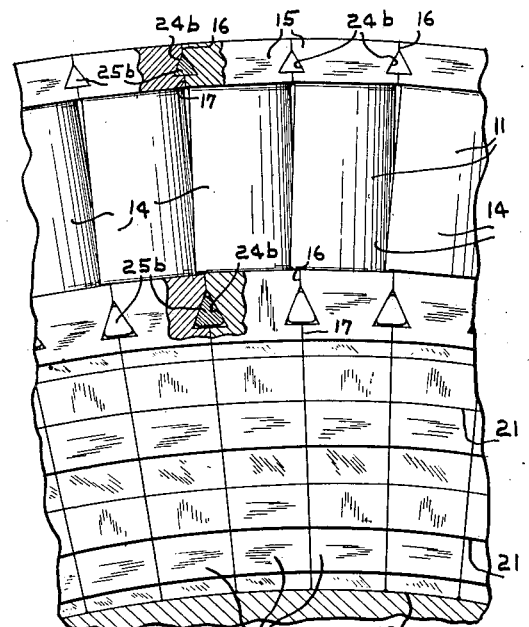
Fig. 3 shows a further modified form of the damping means.

In Figs. 2 and 3, there are shown embodiments of the invention wherein centrifugal force causes a more pronounced wedging effect and consequent large frictional forces opposing vibration. In Fig. 2, a pin 25a of circular section fits in transverse grooves, each of substantially larger curvature radius than that of the pin, whereby the arcuate extent of each recess is substantially less than 180° and the resulting opening defines outwardly-converging surfaces with which the pin engages.

In Fig. 3, the wedging effect is accomplished by providing recesses complementally forming openings 24b of triangular section and the pins are of like section. As the openings and the pins converge outwardly, it will be apparent that the force acting on the pins causes the latter to be wedged against the adjacent blade surfaces under pressure sufficient to develop adequate friction for absorbing vibration energy.

While the invention has been shown in several forms, it will be obvious to those skilled in the art that it is not so limited, but is susceptible of various other changes and modifications without departing from the spirit thereof, and it is desired, therefore, that only such limitations shall be placed thereupon as are specifically set forth in the appended claims.

What is claimed is:

1. In a turbine, a row of moving blades having adjacent surfaces, means providing openings extending transversely of the blades and formed by complementary grooves in the adjacent blade surfaces, each of said openings having a section which is elongated radially of the blade row, pins in the openings, each pin and each opening converging outwardly so that centrifugal force exerted on the pin causes the latter to be wedged frictionally against the adjacent blade surfaces.

2. In a turbine, a row of moving blades having adjacent surfaces, means providing openings extending transversely of the blades, each opening being formed by complementary grooves provided in adjacent blade faces, and pins in the opening subject to centrifugal force to cause them to engage the adjacent blades frictionally for resisting vibration of the latter, each pin being of circular section and each opening being of a section which is elongated in radial direction so as to provide outwardly-converging surfaces to cause the pin to be wedged against the adjacent blades under the influence of centrifugal force.

3. In a turbine, a row of moving blades having adjacent surfaces, means providing openings extending transversely of the blades, each opening being formed by complementary grooves provided in adjacent blade faces, and pins in the openings subject to centrifugal force to cause them to engage the adjacent blades frictionally for resisting vibration of the latter, the pins and openings each being of triangular cross section and the openings being so disposed that they converge outwardly in relation to the blades so that centrifugal force exerted on the pins causes them to be wedged against the adjacent blades.

WARREN B. FLANDERS.